May 8, 1962    R. V. RAMAGE    3,033,229
HIGH PRESSURE GAS REGULATOR
Filed April 20, 1960
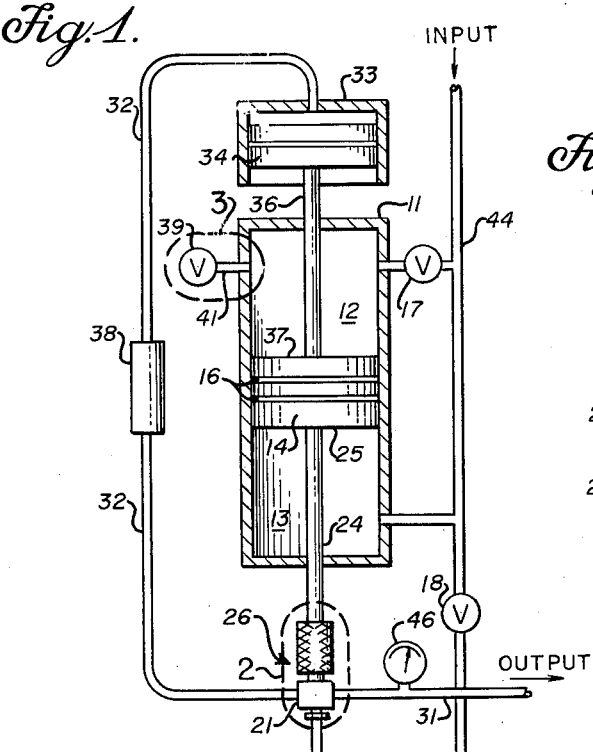
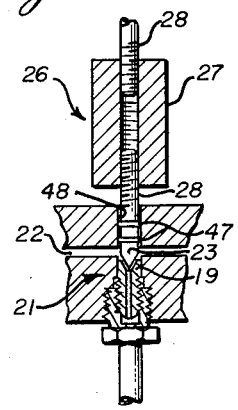
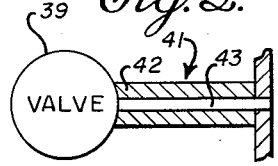
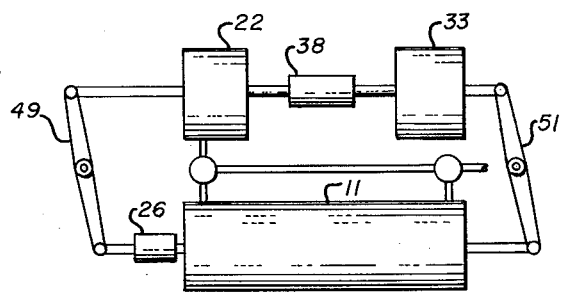
INVENTOR.
ROBERT V. RAMAGE
BY
ATTORNEY

United States Patent Office

3,033,229
Patented May 8, 1962

3,033,229
HIGH PRESSURE GAS REGULATOR
Robert V. Ramage, San Leandro, Calif., assignor to the United States of America as represented by the United States Atomic Energy Commission
Filed Apr. 20, 1960, Ser. No. 23,590
3 Claims. (Cl. 137—494)

This invention relates to gas pressure regulators and more particularly to high pressure, piston operated, gas pressure regulators.

The art of controlling gas pressure has for the most part been exclusively achieved with the use of diaphragms. Pressure differentials on opposite sides of a diaphragm are used to determine the proper position of a valve which will cause a desired pressure to exist. The diaphragm as a sensing mechanism allows for quick and accurate response to changes in pressure when operating on pressures below 10,000 p.s.i. When pressure differentials greater than 10,000 p.s.i. are encountered, however, the diaphragms must be so thick to keep from breaking that a major portion of their sensitivity is lost.

The present invention provides a piston operated gas pressure regulator whose speed and sensitivity are comparable with diaphragm operated regulators, but in addition, possesses sufficient strength to easily handle any desired pressure, being limited only by the strength of the components (components capable of handling 100,000 p.s.i. are not uncommon).

The present invention has a piston as a main control means. The piston is connected to a needle valve and the movement of the piston regulates the flow of gas from the needle valve. The output is obtained from the needle valve. The output pressure is sampled by a feedback means which in turn regulates the movement of the piston. When the output is other than the desired value the feedback system initiates movement of the piston to allow the output to be corrected.

Accordingly it is a principal object of this invention to provide a means for regulating gas pressure.

Another object of the invention is to provide a gas pressure regulator that can regulate pressures in excess of 10,000 p.s.i.

It is another object of this invention to provide a sensitive, accurate gas pressure regulator which operates without the use of a diaphragm.

A further object of this invention is to provide a gas pressure regulator of such construction as to require a minimum of maintenance.

Further objects of the invention will appear from the following description in which is set forth the preferred embodiment of the invention.

Referring to the drawing:

FIGURE 1 is a semischematic illustration of one embodiment of the invention;

FIGURE 2 is a cut-away view of the adjustment device and the needle valve assembly;

FIGURE 3 is a partial cut-away of the bleeder tube; and

FIGURE 4 is an alternate arrangement of the components of the invention.

Referring now to FIGURE 1 a cylindrical main housing 11 is divided into a first airtight chamber 12 and a second airtight chamber 13 by a control piston 14 which is slidably positioned within the main housing. Control piston 14 is equipped with a set of O-rings 16 around its circumference wherein the O-rings bear on the inside surface of the main housing 11 and thereby effectuate an airtight separation between chamber 12 and 13. The inner surface of housing 11 is machined to a polished finish of 8 to 16 micro inches to prevent the contact of the O-rings with the housing inner surface from retarding the motion of the piston.

Referring to FIGURES 1 and 2 a main gas supply (not shown) whose pressure is to be regulated is introduced to the regulator at a manually operated valve 17. Valve 17 gates the flow of input gas (directly from line supply) into chamber 12. The input gas is also conducted to valve 18 which gates the flow of input gas to seat 19 of needle valve 21. Input gas is continuously available to chamber 13. Needle valve 21 regulates the flow of gas from the main supply into a closed chamber 22 which is separate from the main housing. The needle portion 23 of needle valve 21 is attached by means of a connecting rod 24 to the face 25 of piston 14 which forms one wall of chamber 13. The portion of connecting rod 24 exterior to both housing 11 and the chamber 22 has attached thereto a device 26 for adjusting the length of rod 24. Device 26 as seen in FIGURE 2 is a simple combination of a bored and tapped cylinder 27 with a set of matching screws 28 in either end. A turn of the cylinder 27 will cause the screws to either approach or retreat from one another and thereby change the effective length between the needle 23 and piston face 25.

Returning to FIGURE 1 it is seen that two gas pressure lines 31 and 32 are connected to the needle valve 21. Line 31 is connected to the regulated gas output while line 32 leads to a chamber 33 housing a feedback piston 34. Piston 34 has the same diameter as piston 14 and is equipped with an O-ring seal around its circumference. Chamber 33 is an open ended cylinder with a polished interior to allow easy movement of the piston 34. Piston 34 is connected to piston 14 by a rigid push rod 36 which is affixed to the face 37 of piston 14 which forms one of the walls of chamber 12.

A tube 38 having a greater diameter than line 32 and in series therewith prevents hunting of the system by acting as a buffer, i.e., small variations in pressure are attenuated. A bleed valve 39 gates the flow of gas out of chamber 12 through a bleed tube 41. Bleed tube 41 as shown in FIGURE 3 is comprised of an outer support tube 42 having the same outer diameter as the other tubing in the system (¼-inch) and an inner capillary tube 43 of very small outer diameter (¹⁄₁₆-inch) which fits tightly into tube 42 whose inside diameter is only slightly larger than ¹⁄₁₆-inch. The capillary tube 43 allows the gas in chamber 12 to be released at a slow rate which allows for highly accurate settings. Tube 42 not only supports the capillary tube, but also allows a more sturdy ¼-inch valve to be used.

In operation a supply of gas (not shown) under pressure is connected to valve 17. Device 26 for varying the length of connecting rod 24 is adjusted so that the needle valve 21 is closed when control piston 14 is equidistant from the ends of housing 11. Valve 17 is opened and valve 18 is closed allowing the gas flowing from the main supply in pressure line 44 to enter chambers 12 and 13 while being restricted from valve 21. The existence of equal pressures (the pressure of the main supply) on either side of the control piston will cause the piston to assume a position equidistant from either end of the housing. Due to previous adjustment this will cause needle valve 21 to be closed. When chambers 12 and 13 have reached equilibrium, valve 17 is closed sealing chamber 12 from the main supply and valve 18 is opened to allow gas from the main supply to reach needle valve 21.

In order to supply gas to the load through pressure line 31 the pressure on the chamber 12 side of piston 14 is reduced by allowing the gas therein to bleed out through valve 39. This reduction in pressure causes the control piston to move in such a direction as to open needle valve 21. Gas is then allowed to pass through the needle valve which supplies the output. The pressure of the gas in output line 31 is measured by means of pressure gauge 46.

The pressure from needle valve 21 is communicated not only to the output but also to the feedback piston 34 via gas line 32. When the force exerted by piston 34 on piston 14 equalizes the pressure on either side of piston 14, the needle valve will again close. For a system having a control piston and feedback piston of the same diameter the output pressure will be exactly equal to the pressure relieved from chamber 12 through bleed valve 39. The use of equal size control and feedback pistons is obviously not necessary for operation. Only the sensitivity of the system is changed by having a feedback to control piston ratio other than 1.

An equilibrium situation will continue until the output pressure drops (demands more gas) and in turn drops the pressure on piston 34 which allows piston 14 to move so as to unseat valve 21. The gas from the supply is then allowed to build up the output pressure until equilibrium is again reached. In order to keep the system from becoming unequalized when very small variations occur, which if given the time would correct themselves, buffer 38 is placed in line 32 to absorb them before they reach the feedback piston. A sizeable loss of supply pressure will drop the pressure in chamber 13 and cause needle valve 21 to seat. In this way a supply failure is immediately noticeable.

The numerous airtight fittings (not shown) presently used throughout the system are standard high pressure (60,000 p.s.i. rating) type fittings as are the valves.

In FIGURE 2 the movable needle 23 is seen to be equipped with a set of O-rings 47 which allow easy movement yet keep chamber 22 sealed. The surface 48 against which the O-rings 47 bear is polished to a finish of 8-16 micro inches. Another feature of the feedback nature of the system exhibits itself in the self-seating ability of the needle valve 21. If seat 19 becomes worn and consequently leaks, the escaping gas will cause an additional pressure to bear on piston 34. This added pressure will be transmitted back to the needle 23 which will be forced into seat 19 until an airtight seal is again obtained.

An alternate arrangement of the components of the invention is shown in FIGURE 4. The needle vlave 21 and the feedback piston 34 instead of being coaxial with the main housing are mounted along the wall of the housing thereby forming a more compact unit. The necessary forces for operating the regulator are transmitted through cranks 49 and 51. Other than the cranks the system is identical with that of the previously described embodiment and the operation is the same. It is, however, a feature of the invention that it is not restricted to a single arrangement of components but rather is versatile in that respect so as to be able to meet most any space requirement that might be imposed upon it.

The present invention has experienced actual operation and displayed the following results. The system accurately regulated pressures ranging from as low as 50 p.s.i. all the way up to 20,000 p.s.i. The system was stable at all pressures selected between the above range and had a sensitivity of approximately 50 p.s.i. Pressures higher than 20,000 p.s.i. were not tested due to the unavailability of higher pressure sources. The main housing of the system was capable of handling pressures as high as 30,000 p.s.i. and there is no reason to believe that the system would have had any difficulty in regulating a pressure that high if it were available.

Where situations call for high pressures but not great quantities of gas, the present invention can be scaled down to a miniature size and easily provide a 30,000 p.s.i. regulator no larger than a man's fist.

The present invention has been described with reference to but a few preferred embodiments and numerous changes within the spirit and scope of the invention will be apparent to those skilled in the art. It is, therefore, not intended that the invention be limited by other than the following claims.

What is claimed is:

1. In a high pressure gas regulator the combination comprising a main housing, a slidable control piston residing in said housing and dividing said housing into a first and second chamber, an adjustable length rigid connecting rod connected to the face of said piston in said second chamber, a needle valve having a high pressure inlet line connected thereto affixed to said connecting rod, an output pressure line from said needle valve, a rigid push rod connected at one of its ends to the face of said control piston in said first chamber, a feedback piston connected to the other end of said push rod, an open ended cylindrical feedback chamber retaining said feedback piston, an outlet pressure line communicating between said needle valve and said feedback chamber, a first valve and conduit means for gating inlet line pressure into said first chamber, a second valve in said inlet line for gating inlet line pressure to said needle valve, means communicating line pressure to said second chamber, and a bleeder valve for relieving pressure from said first chamber.

2. A high pressure gas regulator as claimed in claim 1 wherein said line communicating between said needle valve and said feedback chamber contains an oscillation buffer.

3. In a high pressure gas regulator the combination comprising a main cylindrical high pressure housing having a highly polished interior surface, a slidable control piston residing in said housing and dividing said housing into a first and second chamber, a rigid adjustable length connecting rod connected to the face of said piston in said second chamber and coaxial with said main housing, said connecting rod having a portion exterior of said main housing, a needle valve having a high pressure inlet line connected thereto affixed to the exterior end of said connecting rod, an output pressure line from said needle valve, a rigid push rod connected to the face of said piston in said first chamber and coaxial with said main housing said push rod having an end exterior of said housing, a feedback piston connected to the exterior end of said push rod, an open ended feedback chamber coaxial with said main housing and containing said feedback piston, an outlet pressure line communicating between said needle valve and said feedback chamber, an oscillation buffer in said communicating pressure line, a first valve and conduit means for gating inlet line pressure into said first chamber, a second valve in said inlet line for gating inlet line pressure to said needle valve, means communicating line pressure to said second chamber, and a bleeder valve for relieving pressure from said first chamber.

References Cited in the file of this patent

UNITED STATES PATENTS

| | | |
|---|---|---|
| 862,867 | Eggleston | Aug. 6, 1907 |
| 988,495 | Noyes | Apr. 4, 1911 |
| 1,967,981 | Thomas | July 24, 1934 |
| 2,164,095 | Thomas | June 27, 1939 |
| 2,806,481 | Faust | Sept. 17, 1957 |
| 2,897,833 | Seeler | Aug. 4, 1959 |